(12) United States Patent
Morimoto

(10) Patent No.: US 10,687,181 B2
(45) Date of Patent: Jun. 16, 2020

(54) VARIOUS DISPLAY MODES FOR DISPLAYING WARNING SIGNS ON ELECTRONIC APPARATUS

(71) Applicant: SEIKO EPSON CORPORATION, Tokyo (JP)

(72) Inventor: Keiichi Morimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/254,836

(22) Filed: Jan. 23, 2019

(65) Prior Publication Data
US 2019/0239036 A1 Aug. 1, 2019

(30) Foreign Application Priority Data
Jan. 26, 2018 (JP) ................. 2018-011420

(51) Int. Cl.
*H04W 4/12* (2009.01)
*H04W 76/18* (2018.01)
*G09G 5/00* (2006.01)
*H04W 84/18* (2009.01)
*H04W 84/12* (2009.01)

(52) U.S. Cl.
CPC ........... *H04W 4/12* (2013.01); *G09G 5/00* (2013.01); *H04W 76/18* (2018.02); *G09G 2370/16* (2013.01); *G09G 2370/22* (2013.01); *H04W 84/12* (2013.01); *H04W 84/18* (2013.01)

(58) Field of Classification Search
CPC ........... H04W 4/12; H04W 76/18; G09G 5/00
See application file for complete search history.

(56) References Cited

U.S. PATENT DOCUMENTS

| 8,972,892 B2 * | 3/2015 | Schuller | G06F 9/451 |
| | | | 715/808 |
| 2011/0063284 A1 * | 3/2011 | Sudoh | G09G 5/00 |
| | | | 345/418 |

(Continued)

FOREIGN PATENT DOCUMENTS

JP 2007-081741 A 3/2007

OTHER PUBLICATIONS

European Search Report issued in Applicaiton EP19153665 dated May 24, 2019. User Experience: "Don't ask me again" as 1-9 a checkbox or a button? Published Aug. 3, 2017.

*Primary Examiner* — Chi H Pham
*Assistant Examiner* — Weibin Huang
(74) *Attorney, Agent, or Firm* — Workman Nydegger

(57) ABSTRACT

An electronic apparatus includes a communication unit that performs wireless communication which uses an internal access point, a processing unit, and a display unit. In a state where the number of terminal apparatuses that establish a wireless connection to the internal access point reaches an upper limit value, in a case where a wireless connection request is received from a terminal apparatus that does not establish a wireless connection, the processing unit rejects the wireless connection request and performs processing that displays an alert in a first display mode on the display unit. Moreover, in a case where, until a given period of time has elapsed after the alert was kept non-displayed, the wireless connection request is again received from the terminal apparatus, the processing unit performs processing that sets a mode for displaying the alert to be a second display mode.

9 Claims, 11 Drawing Sheets

(56) References Cited

U.S. PATENT DOCUMENTS

| | | | |
|---|---|---|---|
| 2013/0107100 A1* | 5/2013 | Okada | H04N 5/23216 348/333.04 |
| 2014/0189585 A1* | 7/2014 | Brush | B60R 16/023 715/808 |
| 2017/0098066 A1* | 4/2017 | Haba | G06F 21/34 |
| 2017/0279988 A1* | 9/2017 | Tsuchiya | G06F 3/1203 |

* cited by examiner

VARIOUS DISPLAY MODES FOR DISPLAYING WARNING SIGNS ON ELECTRONIC APPARATUS

BACKGROUND

1. Technical Field

The present invention relates to an electronic apparatus.

2. Related Art

A technique for providing a direct connection between a terminal apparatus and an electronic apparatus (for example, a printer) without an external access point being involved is known. The direct connection, for example, can be realized by communication in an ad hoc mode, which uses Wi-Fi (a registered trademark) technology, and or communication in compliance with WFD (Wi-Fi Direct) standards. In WFD, for example, a printer activates an access point for WFD, and plays the role of the external access point.

An upper limit value of the number of apparatuses that possibly make connections to one electronic apparatus (one internal access point) at the same time is set as a standard for performing direct connection such as WFD. In a state where the number of terminal apparatuses that make wireless connections to the electronic apparatus at the same time reaches the upper limit value, in a case where a new terminal apparatus makes a wireless connection request to the internal access point, the wireless connection request is rejected.

In a case where the wireless connection request is rejected, information containing a cause of the rejection is notified to a user, and thus it is possible that the user is urged to take action. For example, a technique for displaying an alert screen on a display unit of a digital camera when a wireless connection fails is disclosed in JP-A-2007-81741.

An operating system (OS) of a terminal apparatus has a function in which, in a case where the wireless connection fails, a wireless connection request is automatically made to an internal access point using an SSID or a pass phrase of the internal access point, which is stored in a memory. In a case where a wireless connection request is made to the internal access point with high frequency and the wireless connection request is rejected, an alert is displayed with high frequency on a display unit of an electronic apparatus. This makes a user feel bothered and decreases convenience of the user who uses the electronic apparatus.

SUMMARY

An advantage of some aspects of the invention is to provide an electronic apparatus and the like that report a cause of a failure in a wireless connection to a user in a case where the wireless connection to a terminal fails and provides increased user convenience.

According to an aspect of the invention, there is provided an electronic apparatus including: a communication unit that performs wireless communication which uses an internal access point of the electronic apparatus; a processing unit that performs communication control of the communication unit; and a display unit, in which, in a state where the number of terminal apparatuses that establish wireless connections to the internal access point reaches an upper limit value of the number of the terminal apparatuses that possibly make connections to the internal access point, in a case where the communication unit receives a wireless connection request from a terminal apparatus that does not establish a wireless connection to the internal access point, the processing unit rejects the wireless connection request from the terminal apparatus that does not establish the wireless connection, and performs processing that displays an alert, which indicates that a cause of the rejection of the wireless connection request is that the number of the terminal apparatuses that establish the wireless connections to the internal access point reaches the upper limit value, in a first display mode on the display unit, and in which, in a case where, until a given period of time has elapsed after the alert was kept non-displayed, the wireless connection request is again received from the terminal apparatus, to which the communication unit does not establish the wireless connection, the processing unit performs processing that sets a mode for displaying the alert to be a second display mode that is different from the first display mode.

With this configuration, in the case where the number of the terminal apparatuses that establish the wireless connection to the internal access point of the electronic apparatus reaches the upper limit value, in the case where the wireless connection request is received from the terminal apparatus that does not establish the wireless connection, the wireless connection request is rejected and the alert is displayed. Moreover, according to the aspect of the invention, in the case where the wireless connection request is again received until the given period of time has elapsed after the alert was kept non-displayed, the processing that changes the mode for displaying the alert is performed. If this is done, the mode for displaying the alert can be changed according to a situation of the wireless connection request. Consequently, even in a case where the terminal apparatus makes the wireless connection request with high frequency, the user convenience can be suppressed from being decreased.

Furthermore, in the electronic apparatus, in a case where a user performs operation inputting on the electronic apparatus before the given period of time has elapsed after the alert was kept non-displayed, the processing unit may perform processing that updates the given period of time.

In this manner, the given period of time is controlled based on a user operation, and thus it is possible that the mode for displaying the alert is controlled according to a situation of the operation.

Furthermore, in the electronic apparatus, the processing unit may perform processing that keeps the alert non-displayed, as processing that sets the mode for displaying the alert to be second display mode.

If this is done, because the alert display within the given period of time is suppressed, a constraint on the user operation can be suppressed.

Furthermore, in the electronic apparatus, the processing unit may perform processing that narrows down an area for displaying the alert, compared with the first display mode, as processing that sets the mode for displaying the alert to be the second display mode.

If this is done, because the alert display within the given period of time is suppressed, the constraint on the user operation can be suppressed.

Furthermore, in the electronic apparatus, the processing unit may perform the processing that displays the alert in the first display mode on the display unit, in a case where the communication unit receives a wireless connection request from a second terminal apparatus that is different from any one of the terminal apparatus that establishes the wireless connection to the internal access point and the terminal apparatus that does not establish the wireless connection to the internal access point, until the given period of time elapsed.

If this is done, it is also possible that, within the given period of time, the alert is displayed in a suitable mode.

Furthermore, the electronic apparatus further may include a storage unit in which identification information on the terminal apparatus that has made a wireless connection request to the communication unit is stored, in the state where the number of the terminal apparatuses that establish the wireless connections to the internal access point reaches the upper limit value, in which, in the state where the number of the terminal apparatuses that establish the wireless connections to the internal access point reaches the upper limit value, in a case where the communication unit receives a wireless connection request from a given terminal apparatus, the processing unit may compare identification information on the terminal apparatus that makes the wireless connection request against the identification information that is stored in the storage unit, and, in a case where identification information that is the same as the identification information on the terminal apparatus that makes the wireless connection request is not present in the storage unit, the processing unit may perform the processing that displays the alert in the first display mode on the display unit.

In this manner, the terminal apparatus that makes the wireless connection request is identified, and thus it is possible that the need for the alert is determined and then the mode for displaying the alert is decided.

Furthermore, in the electronic apparatus, the processing unit may perform processing that changes the mode for displaying the alert, according to the number of times that the wireless connection request is received from the terminal apparatus to which the communication unit does not establish the wireless connection, until the given period of time has elapsed after the alert was kept non-displayed.

If this is done, it is possible that the mode for displaying the alert within the given period of time is flexibly changed.

Furthermore, in the electronic apparatus, in a case where the first wireless connection request is received from the terminal apparatus to which the communication unit does not establish the wireless connection, within the given period of time after the alert was kept non-displayed, the processing unit may display the alert on the display unit and may perform processing that automatically sets the displayed alert to be kept non-displayed, and, in a case where the second or later wireless connection request is received from the terminal apparatus to which the communication unit does not establish the wireless connection, the processing unit may not display the alert.

If this is done, it is possible that the mode for displaying the alert within the given period of time is flexibly changed.

Furthermore, in the electronic apparatus, in a case where the first wireless connection request is received from the terminal apparatus to which the communication unit does not establish the wireless connection, within the given period of time after the alert was kept non-displayed, the processing unit may perform processing that prints the alert, and, in a case where the second or later wireless connection request is received from the terminal apparatus to which the communication unit does not establish the wireless connection, the processing unit may not perform printing and displaying of the alert.

If this is done, it is possible that a mode for reporting the alert within the given period of time is flexibly changed.

BRIEF DESCRIPTION OF THE DRAWINGS

The invention will be described with reference to the accompanying drawings, wherein like numbers reference like elements.

DESCRIPTION OF EXEMPLARY EMBODIMENTS

The present embodiment will be described below. It is noted that the present embodiment which will be described below does not improperly limit the subject matter of the invention that is claimed in a claim. Furthermore, all configurations that will be described in the present embodiment are not necessarily configurational requirements for the invention.

1. Example of a Configuration of a System

Figure 1:
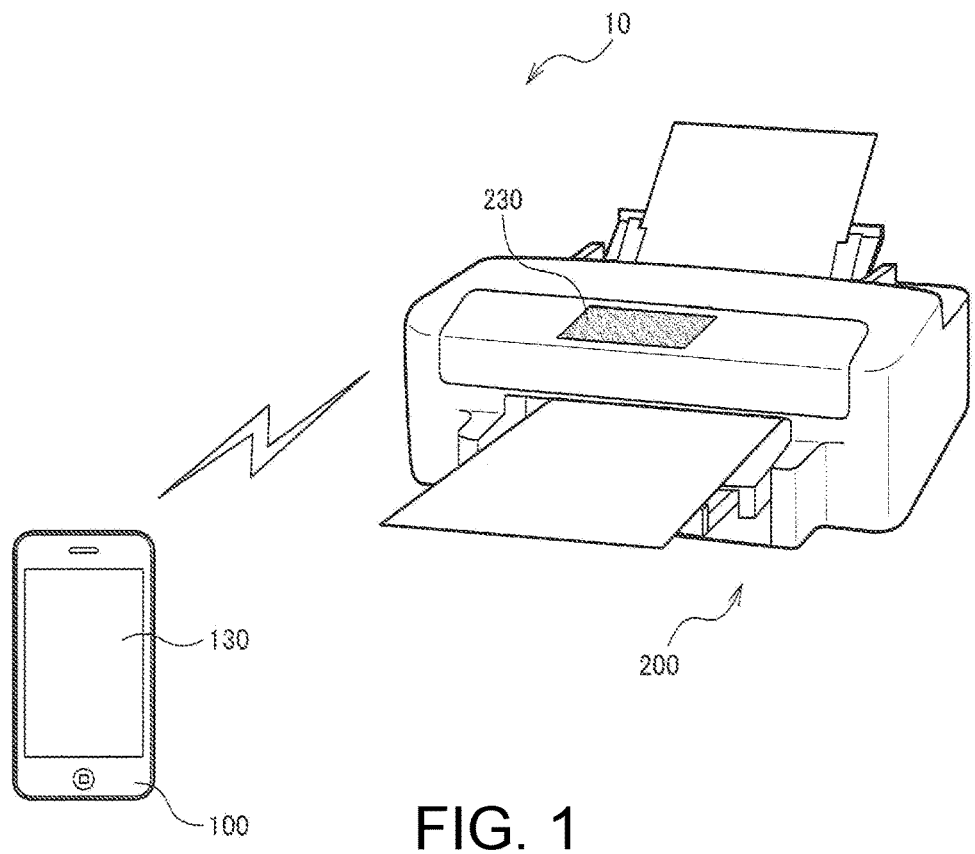
FIG. 1 is a diagram illustrating an example of a configuration of a communication system including a terminal apparatus and an electronic apparatus.

FIG. 1 is a diagram schematically illustrating an example of a communication system 10 that includes an electronic apparatus 200 according to the invention. The communication system 10 includes a terminal apparatus 100 and the electronic apparatus 200.

The terminal apparatus 100 may be a mobile terminal apparatus, such as a smartphone or a tablet apparatus, and may be an apparatus such as a PC.

The electronic apparatus 200, for example, is a printer (a printing apparatus). Alternatively, the electronic apparatus 200 may be a scanner, a facsimile machine, or a copy machine. The electronic apparatus 200 may be a multifunction peripheral (MFP) that has multiple functions, and a multifunction peripheral that has a printing function is also an example of the printer. Alternatively, the electronic apparatus 200 may be a projector, a head-mounted display device, a wearable device (a wrist-wearable device or the like), a biological information measuring instrument (a pulse meter, a pedometer, or a physical activity meter), a robot, a video apparatus (a camera or the like), a mobile information terminal (a smartphone, a mobile game machine, or the like), a physical quantity measuring instrument, or the like.

It is possible that the terminal apparatus 100 and the electronic apparatus 200 perform wireless communication. The wireless communication here is communication in compliance with Wi-Fi standards. Specifically, the electronic apparatus 200 activates an internal access point (a software access point), and the terminal apparatus 100 makes a connection to the internal access point.

Figure 2:
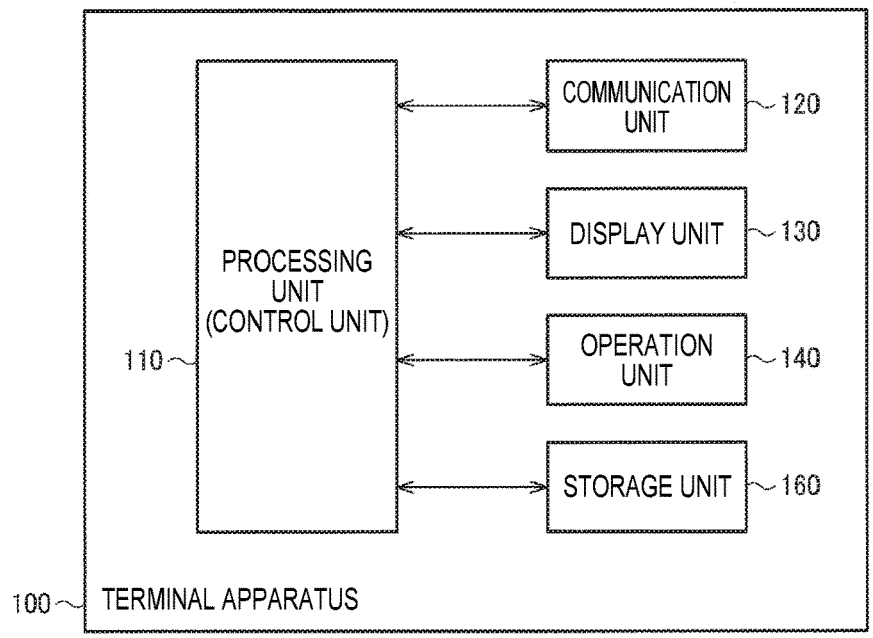
FIG. 2 is a diagram illustrating an example of a configuration of the terminal apparatus.

FIG. 2 is a block diagram illustrating an example of a configuration of terminal apparatus 100. The terminal apparatus 100 includes a processing unit 110 (a processor), a communication unit 120 (a communication interface), a display unit 130 (a display), an operation unit 140 (an operation button or the like), and a storage unit 160 (a memory).

The processing unit 110 (a processor or a controller) performs control of each of the communication unit 120, the display unit 130, the operation unit 140, and the storage unit 160. The communication unit 120 includes a wireless communication device (a wireless communication chip) that performs the wireless communication in compliance with Wi-Fi standards. The communication unit 120 makes a wireless connection to the internal access point of the electronic apparatus 200. The display unit 130 is configured with a display on which various pieces of information are displayed for a user, and the like, and the operation unit 140 is configured with a button on which the user performs an input operation, and the like. It is noted that, for example, the display unit 130 and the operation unit 140 may be configured to be integrally combined into a touch panel.

Various pieces of information and data, and various programs are stored in the storage unit 160 (a storage device or a memory). The processing unit 110 or the communication unit 120, for example, operates with the storage unit 160 as a working area. The storage unit 160 may be a semiconductor memory, such as a static random access memory (SRAM) or a dynamic random access memory (DRAM), may be a register, be a magnetic memory device such as a hard disk drive (HDD), and may be an optical storage device such as an optical disk.

Figure 3:
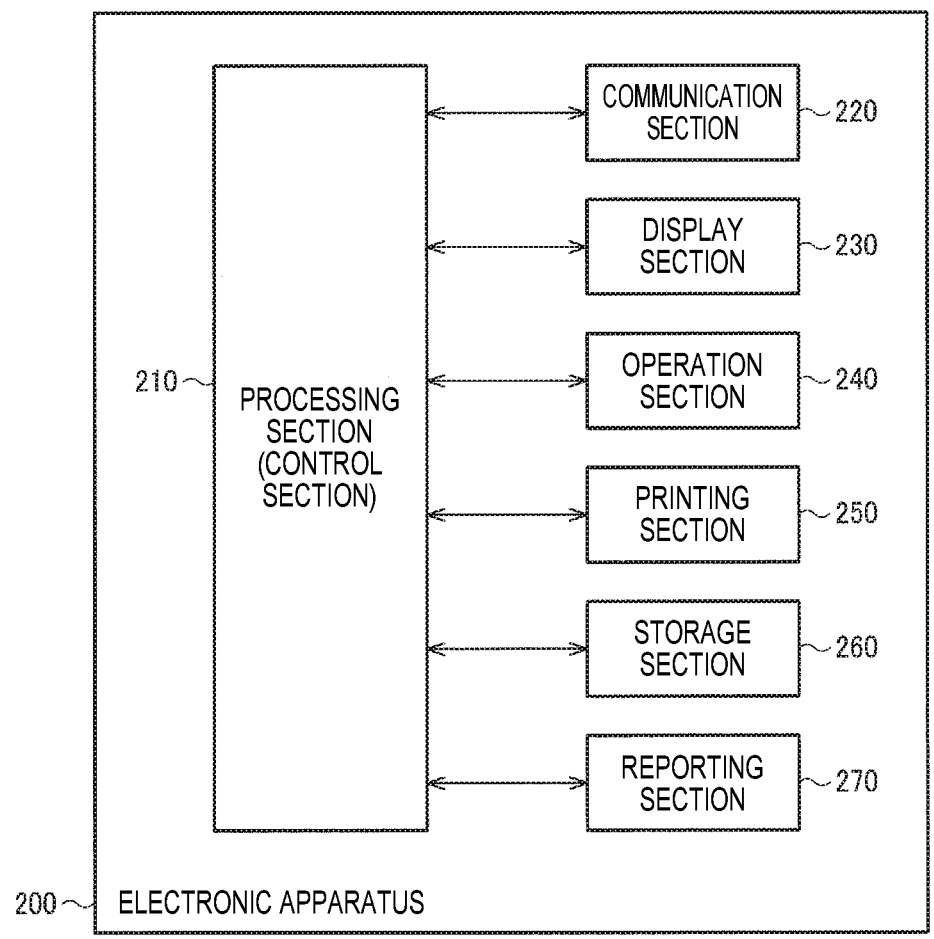
FIG. 3 is a diagram illustrating an example of a configuration of the electronic apparatus.

FIG. 3 is a block diagram illustrating an example of a configuration of the electronic apparatus 200. It is noted that FIG. 3 illustrates the electronic apparatus 200 (a printer) that has a printing function and that an example where the electronic apparatus 200 is a printer will also be described below. However, as described above, examples of the electronic apparatus 200 further include apparatuses other than the printer. The electronic apparatus 200 includes a processing unit 210 (a processor), a communication unit 220 (a communication interface), a display unit 230 (an interface), an operation unit 240 (an operation panel), a printing unit 250, a storage unit 260 (a memory), and a reporting unit 270.

The processing unit 210 (a processor or a controller) performs control each of the units (the communication unit, the storage unit, the printing unit, and the like) of the electronic apparatus 200, or performs various processing operations according to the present embodiment. For example, the processing unit 210 can include multiple CPUs (micro-processing units) (MPUs), for example, a central processing unit (CPU) and a sub-CPU. The main CPU (a main CPU control substrate) performs control of each of the units of the electronic apparatus 200 or overall control. The sub-CPU performs various processing operations for printing, for example, in a case where the electronic apparatus 200 is a printer. Alternatively, a CPU for communication processing may be further provided.

Each processing operation and each function according to the present embodiment, which is performed by the processing unit 210, can be realized by a processor that includes hardware. For example, each processing operation according to the present embodiment can be realized by a processor that operates based on a program and data, and a memory in which the program and the data are stored. The processor here, for example, may cause a function of each unit to be realized in individual hardware or may cause the function of each unit to be realized in integrated hardware. For example, the processor includes hardware, and the hardware can include at least one of a circuit that processes a digital signal and a circuit that processes an analog signal. For example, the processor can be configured with one, or multiple circuit devices that are mounted on a circuit substrate, or with one or multiple circuit elements. The circuit device here is an integrated circuit (IC), or the like, and the circuit element is a resistor, a capacitor, or the like. The processor, for example, may be a CPU. However, the processor is not limited to the CPU, and it is possible that various processors such as a graphics processing unit (GPU) and a digital signal processor (DSP) are used. Furthermore, the processor may be a hardware circuit such as an application specific integrated circuit (ASIC). Furthermore, the processor may be configured with multiple CPUs, and may be configured with hardware circuits such as multiple ASICs. Furthermore, the processor may be configured with a combination of multiple CPUs and hardware circuits, such as multiple ASICs.

The communication unit 220 includes a wireless communication device (a wireless communication chip) that performs wireless communication in compliance with Wi-Fi standards. The communication unit 220 activates an internal access point according to a given connection setting, and receives a connection request from the terminal apparatus 100. The connection setting is a setting of a service set identifier (SSID) or a pass phrase, or is a setting of a communication frequency band (a communication channel).

The display unit 230 is configured with a display on which various pieces of information are displayed for a user, and the like, and the operation unit 240 is configured with a button on which the user performs an input operation, and the like. It is noted that, for example, the display unit 230 and the operation unit 240 may be configured to be integrally combined into a touch panel. The reporting unit 270 may be, for example, a speaker that performs reporting using audio, may be a vibration (a vibration motor) that performs reporting using vibration, and may be a combination of these.

The printing unit 250 includes a printing engine. The printing engine has a mechanical configuration in which printing of an image is performed on a printing medium. The printing engine, for example, includes a transportation mechanism, an ink jet type discharge head, and a driving mechanism for a carriage including the discharge head, and the like. The printing engine discharges ink from the discharge head onto the printing medium (a sheet of paper or a piece of cloth) that is transmitted by the transportation mechanism, and thus prints an image on the printing medium. It is noted that the specific configuration of the printing engine is not limited to that described here as an example, and may be one in which printing that uses toner is performed by a laser method.

Various pieces of information and data, and various programs are stored in the storage unit 260 (a storage device or a memory). The processing unit 210 or the communication unit 220, for example, operates with the storage unit 260 as a working area. The storage unit 260 may be a semiconductor memory, may be a register, may be a magnetic memory device, and may be an optical storage device. For example, identification information on the terminal apparatus 100 that has made a wireless connection request is stored in the storage unit 260.

2. Technique According to the Present Embodiment

Figure 4:
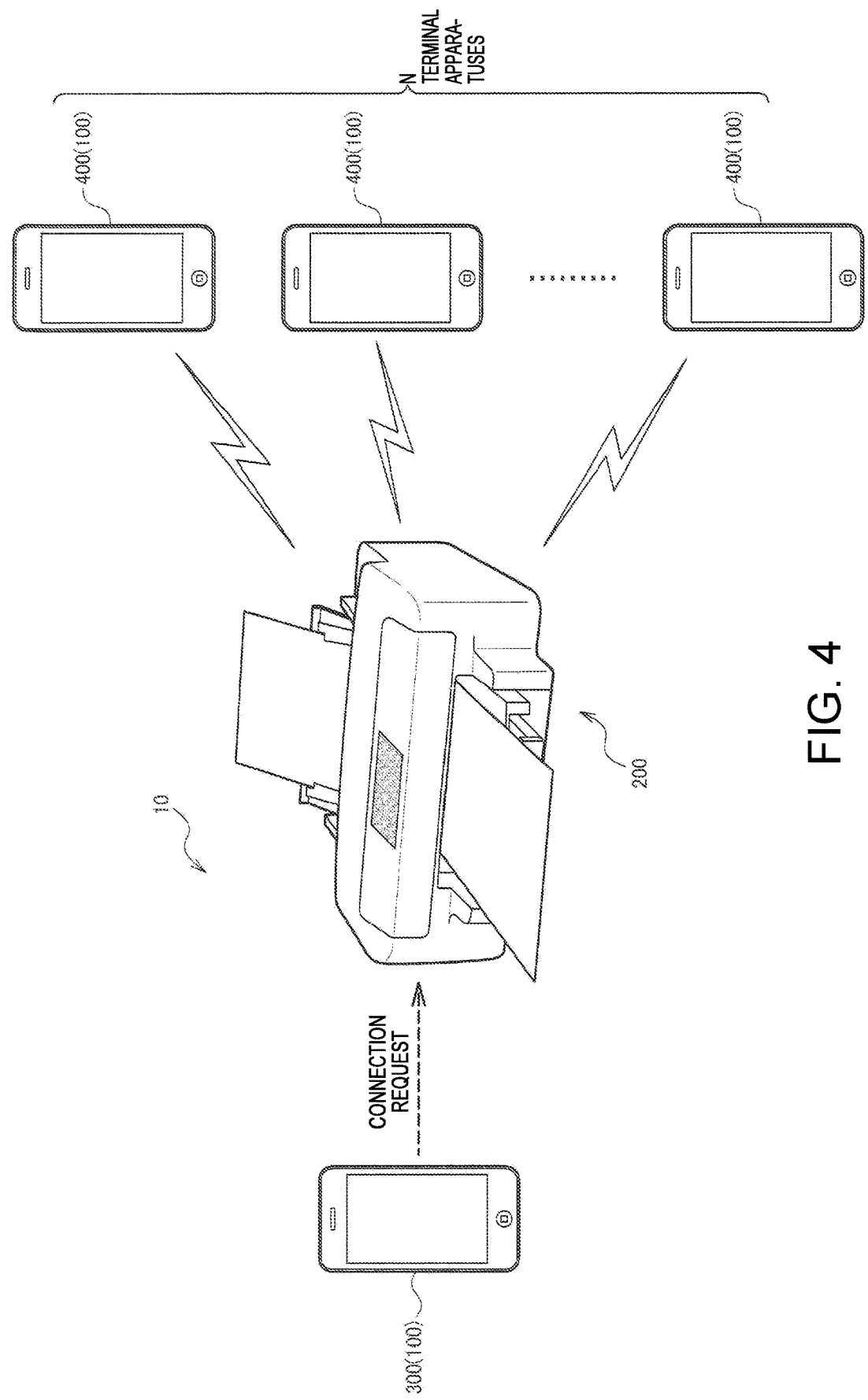
FIG. 4 is a descriptive diagram of a situation of a connection that is assumed in the present embodiment.

FIG. 4 is a schematic diagram for describing a connection state that is assumed in the present embodiment. With the internal access point that is activated by the communication unit 220, the electronic apparatus 200 is caused to makes wireless connections to N terminal apparatus 100. The terminal apparatus 100 that establishes a wireless connection to the electronic apparatus 200 is hereinafter expressed as an existing connection terminal 400.

The wireless communication according to the present embodiment is communication in an ad hoc mode for Wi-Fi, or is communication in compliance with a WFD scheme. However, it may be considered that the wireless connection according to the present embodiment further complies with other communication standards. The internal access point here is an access point, which is activated in the communication unit 220 of the electronic apparatus 200, for directly connecting the terminal apparatus 100 and the electronic apparatus 200, and is an access point that is different from an external access point which is activated in an external apparatus (for example, a wireless LAN router) other than these apparatuses.

Furthermore, N here represents an upper limit value of the number of terminal apparatuses 100 that possibly make connections to the internal access point at the same time. With the internal access point, it is possible that the electronic apparatus 200 accepts connections from N terminal apparatuses 100 at the same time. For example, N=4, but it is possible that N representing a specific numerical value varies widely.

In a state in FIG. 4, it is assumed that the terminal apparatus 100 which has not yet established a wireless connection to the electronic apparatus 200 makes a wireless connection request to the internal access point of the electronic apparatus 200. The terminal apparatus 100 that has not yet established a wireless connection is hereinafter expressed as a new connection terminal 300 in order to be distinguished from the existing connection terminal 400. In this case, because the number of terminal apparatus 100, which make connections to the internal access point, already reaches an upper limit value, the wireless connection request from the new connection terminal 300 is rejected and the wireless connection is not established between the new connection terminal 300 and the electronic apparatus 200.

Figure 5:
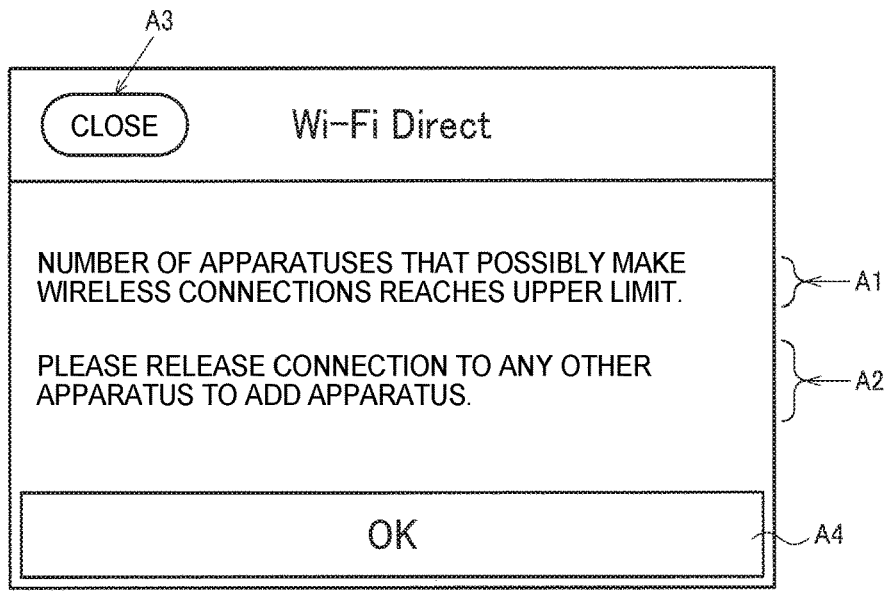
FIG. 5 is a diagram illustrating an example of a screen for displaying an alert.

In this case, as disclosed in JP-A-2007-81741, it is preferable that an alert is displayed on the display unit 230 of the electronic apparatus 200. If the alert is displayed, it is possible that a cause of the non-establishment of the wireless connection is made to be understandable to the user. Because of this, the user can be urged to take action, such as disconnecting the existing connection terminal 400. FIG. 5 illustrates an example of a screen on which the alert is displayed. In the example in FIG. 5, a message (A1) that the number of apparatuses that possibly make connections reaches the upper limit value and a message (A2) that a connection to any other apparatus is released for the establishment of the wireless connection to the new connection terminal 300 are displayed in text. Thus, suitable information is provided to the user.

However, a function in which, in a case where the wireless connection request is rejected, a reconnection request is automatically made after a given time elapsed is built into an OS running on a smartphone or a PC. A specific interval of time during which the reconnection is made varies according to a type of OS or the type of terminal apparatus 100, but, for example, is approximately several tens of seconds to several minutes. In a case where the rejection of the wireless connection request simply triggers the display of the alert, the display of the alert in FIG. 5 is repeated at time intervals of several tens of seconds.

Particularly, FIG. 5 illustrates an example in which the alert is displayed on the entire display unit 230 of the electronic apparatus 200. For this reason, the user cannot view information other than the alert, as long as the user does not perform an operation of keeping the alert non-displayed, such as pushing down on a button "CLOSE" (A3) or a button "OK" (A4).

Figure 6:
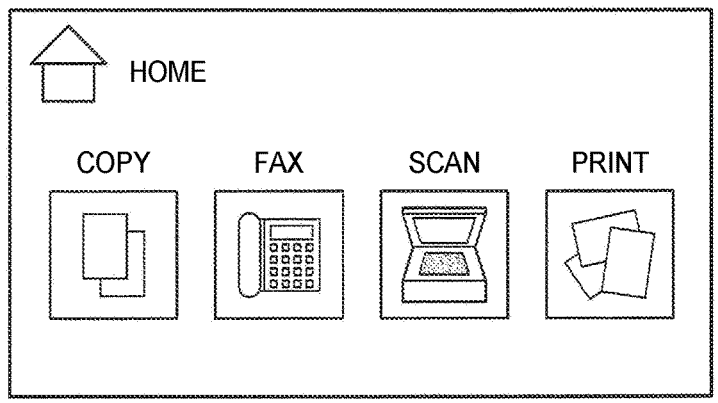
FIG. 6 is a diagram illustrating an example of a home screen.
Figure 7:
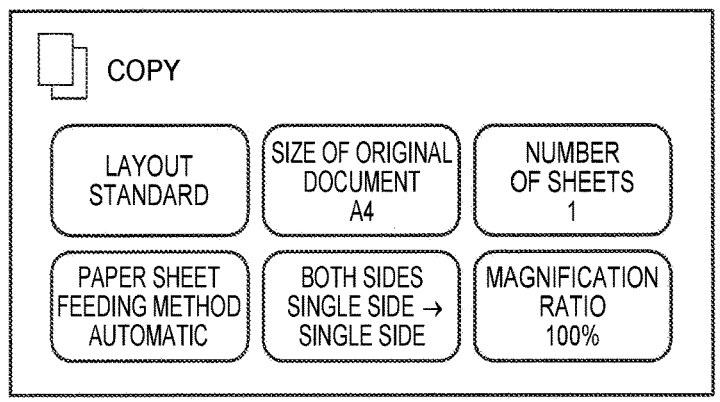
FIG. 7 is a diagram illustrating an example of a copy screen.
Figure 8:
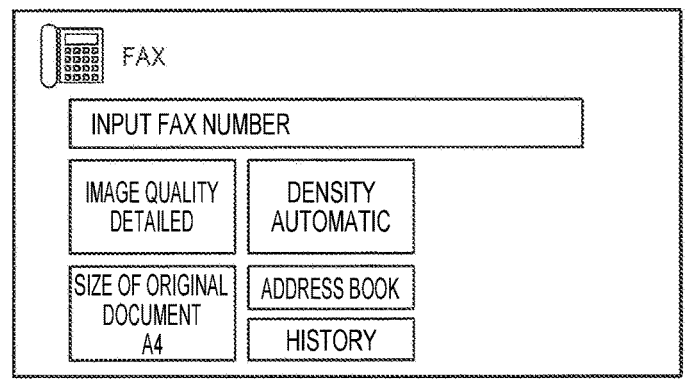
FIG. 8 is a diagram illustrating an example of a facsimile screen.

Each of FIGS. 6 to 8 illustrates an example of a screen on which information other than the alert is displayed, among screens that are displayed on the display unit 230 of the electronic apparatus 200. FIG. 6 illustrates an example of a home screen of the electronic apparatus 200 (an MFP). Multiple functions the electronic apparatus 200 have are displayed on the home screen. When any one of the multiple functions is selected, transitioning to a display screen relating to the selected function is performed. In an example of the home screen in FIG. 6, a copy function, a facsimile function, a scanning function, and a printing function are selectable.

FIG. 7 illustrates a display screen relating to the copy function, on which various pieces of setting information relating to the copy function are displayed such as a layout or a size of an original document, and on which each setting is possibly changed by touching on a button or the like. FIG. 8 illustrates a display screen relating to the facsimile function, on which various pieces of setting information relating to the facsimile function are displayed such as a field for entering a facsimile number of a transmission destination, image quality, a density, a size of an original document, or the like. On the display in FIG. 8, inputting of a number or changing of each setting is possible by touching on a button and so on. Furthermore, it is also possible that various screens other than those in FIGS. 6 to 8, such as a scanning screen for selecting a retention destination (a transmission destination) of scanned data and a printing screen for performing selection of printing target data or printing setting, are displayed on the display unit 230 of the electronic apparatus 200.

When the user is going to select a desired function from the home screen or is performing setting on the copy screen or the facsimile screen, if the wireless connection request is made from the new connection terminal 300, a screen in FIG. 5 is displayed. In order for the user to return to an original screen to continue the operation, the user needs to perform an operation of pushing down on a A3 or A4 button. When the display of the alert is repeated for a time span of several tens of seconds or so, a user operation for erasing the alert needs to be performed each time, and there is a concern that this will make the user feel bothered.

As described above, in a case where the wireless connection request is rejected, it is important that the alert is displayed, but, instead, there is a concern that excessive alert display will decrease user convenience. The electronic apparatus 200 according to the present embodiment, as illustrated in FIG. 3, includes the communication unit 220 that performs wireless communication which uses the internal access point of the electronic apparatus 200, the processing unit 210 that performs communication control of the communication unit 220, and the display unit 230.

As illustrated in FIG. 4, a case is considered which, in a case where the number of terminal apparatuses 100 (the existing connection terminals 400) that establish wireless connections to the internal access point reaches an upper limit value N of the number of terminal apparatuses 100 that possibly make connections to the internal access point, the communication unit 220 receives the wireless connection request from the terminal apparatus 100 (the new connection terminal 300) that does not establish a wireless connection to the internal access point. In this case, first, the processing unit 210 rejects the wireless connection request from the terminal apparatus 100 that does not establish a wireless connection. Then, the processing unit 210 performs processing that displays on the display unit 230 in a first display mode an alert indicating that a cause of the rejection of the wireless connection request is that the number of terminal apparatuses 100 which possibly make connections to the internal access point reaches the upper limit value N. The first display mode here is a display mode in which emphasis is put on the user's recognition of the alert. In a narrow sense, the first display mode is a mode in which the alert, as illustrated in FIG. 5 is displayed on the entire display unit 230. The first display mode is hereinafter referred to as a first mode in order to simplify the description thereof.

Moreover, in the present embodiment, in a case where, until a given period of time has elapsed after the alert was kept non-displayed, the wireless connection request is again received from the terminal apparatus 100, to which the communication unit 220 does not establish a wireless connection, the processing unit 210 performs processing that sets a mode for displaying the alert to be a second display mode that is different from the first display mode described above. In a narrow sense, the second display mode is a mode in which the alert display is suppressed in contrast with the first display mode. The second display mode may be a mode in which the alert is set to be kept non-displayed, and may be a mode in which a screen in FIG. 11 or 12 that will be described below is displayed. The second display mode is hereinafter referred to as a second mode in order to simplify the description thereof. It is noted that in the present embodiment, as a display mode of the alert in a case where the wireless connection request is received within a given period of time, at least the second mode may be included and that, as will be described below with reference to FIG. 15, the mode for displaying the alert is any other mode, such as a third mode, without any constraint.

Figure 9:
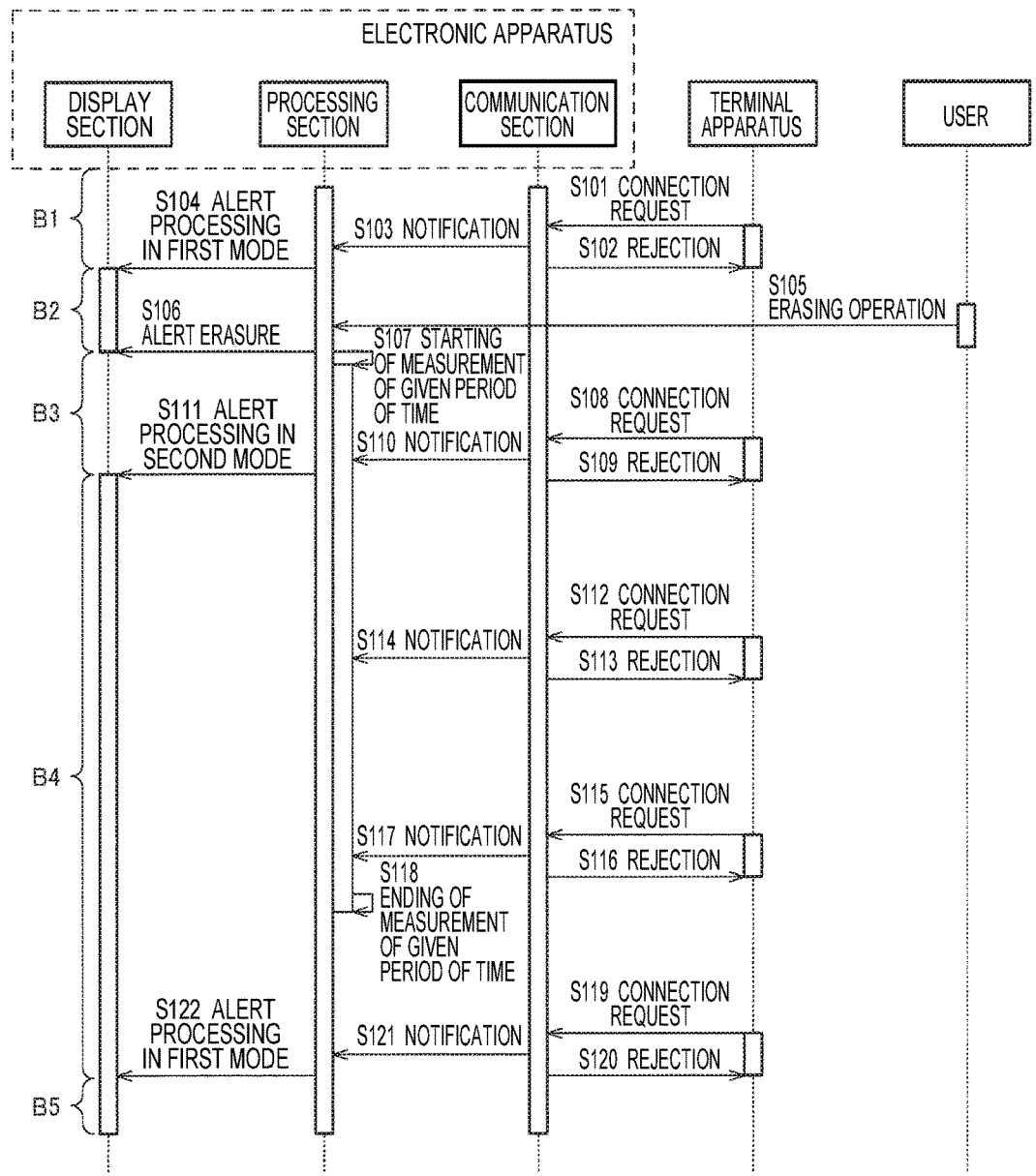
FIG. 9 is a sequence diagram for describing processing according to the present embodiment.

FIG. 9 is a sequence diagram for describing processing according to the present embodiment. FIG. 9 is a diagram for describing processing in a state where, as described above, the number of terminal apparatuses 100 that establish wireless connections to the internal access point reaches the upper limit value N. When the processing starts, the wireless connection request from the terminal apparatus 100 (the new connection terminal 300), a wireless connection to which is not established, is made to the communication unit 220 of the electronic apparatus 200 (S101), and the communication unit 220 rejects the wireless connection request (S102).

The processing unit 210 receives a notification that the wireless connection request arrives from the new connection terminal 300, from the communication unit 220. Then, the processing unit 210 performs the processing that displays an alert for presenting the cause of the rejection of the wireless connection request, on the display unit 230. The processing unit 210 performs processing that displays the alert in a normal mode (the first mode) (S104), and for example, the screen in FIG. 5 is displayed on the display unit 230.

The user performs an operation of erasing an alert screen, on the alert display in FIG. 5, and the processing unit 210 detects that the erasing operation is performed (S105). It is noted that the operation unit 240 is omitted in FIG. 5, but that a user operation is performed on the operation unit 240 (examples of this include a touch panel that results from an integral combination with the display unit 230), and that the processing unit 210 detects the user operation based on a signal from the operation unit 240. When the erasing operation is detected, the processing unit 210 performs the operation of erasing the alert (S106), and the display unit 230 deletes the alert. After the alert erasing, for example, processing is performed in which returning to a screen that was present prior to the alert display is caused to take place, and the screens in FIGS. 6 to 8 are displayed on the display unit 230.

The processing unit 210 starts measurement processing for a given period of time, which is triggered by erasing the alert screen (S107). It is noted that the starting of the measurement processing may be specifically triggered by the detection (S105) of the erasing operation (S105) or by an instruction (S106) to the display unit 230 as to the alert erasing. Alternatively, a response that the alert is erased according to the erasing instruction is received from the display unit 230, and this reception may trigger the starting of the measurement processing. Furthermore, FIG. 9 illustrates the example in which the alert is kept non-displayed based on the user operation, but no limitation to this is imposed. For example, a modification implementation is possible in which the processing unit 210 automatically keeps the alert non-displayed based on the condition that a given time elapsed or that given processing was performed such as printing in the electronic apparatus 200.

The measurement processing that starts in S107 may be count-down processing or count-up processing by a counter. The count-down processing, for example, is processing that decrements a value of the counter by 1 per one second, with an initial value being set to be a value representing the number of seconds for a given period of time. In the count-down processing, in a case where the value of the counter reaches 0, it is determined that a given period of time elapsed. The count-up processing, for example, is processing that increments the value of the counter by 1 per second, with the initial value being set to 0. In the count-up processing, in a case where the counter reaches a value representing the number of seconds for the given period of time, it is determined that a given period of time elapsed. Alternatively, the measurement processing for the given period of time may be processing that specifies an estimation point in time at which a given period of time will have elapsed, based on a current point in time and a length of a given period of time, and that periodically determines whether or not the specified estimation point in time arrives.

As described above, the terminal apparatus 100 (the new connection terminal 300) intermittently makes a wireless connection request. For this reason, although the wireless connection request is rejected in S102, the wireless connection request is automatically again made. (S108). At this stage, N terminal apparatuses 100 also have made connections to the internal access point, and because of this, the wireless connection request is rejected (S109).

In a case where the notification that the wireless connection request arrives from the new connection terminal 300 is received (S110), the processing unit 210 determines whether or not a given period of time elapsed. In the case of S110, the measurement during a given period of time starts in S107, and the given period of time does not end. Consequently, the processing unit 210 performs processing that displays the alert in the second mode that different from a mode (the first mode in FIG. 5) in S104 (S111).

In the same manner as in S112 to S117, the wireless connection request is periodically made from the new connection terminal 300 (S112 and S115), the wireless connection request is rejected (S113 and S116), and a notification to that effect is provided to the processing unit 210 (S114 and S117). The processing unit 210 determines that a given period of time did not elapse, and performs the processing that displays the alert in a mode that is different from the first mode. It is noted that in FIG. 9, the example in which the alert display in the second mode, which starts in S111, continues is illustrated and that, because of this, processing by the processing unit 210, which displays the notification in each of S114 and S117 on the display unit 230, is omitted.

Thereafter, in the processing unit 210, it is determined that the given period of time elapsed, and ends the measurement processing (S118). Specific processing in S118 is variously considered as described above.

Subsequent to the processing in S118, the new connection terminal 300 makes a wireless connection request (S119). At this state, N terminal apparatuses 100 also have made connections to the internal access point. Because of this, the wireless connection request is rejected (S120), and a notification to that effect is provided to the processing unit 210 (S121).

Because the given period of time has elapsed after the alert was kept non-displayed, the processing unit 210 performs the processing that displays the alert in the normal mode (the first mode) (S122), and the screen in FIG. 5 is displayed on the display unit 230. Processing operations in S122 and subsequent steps, for example, are the same as the processing operations in S105 to S118, and the processing unit 210 changes the mode for displaying the alert according to whether or not the wireless connection request is received (and rejected) within the given period of time.

With a technique according to the present embodiment, which is illustrated in FIG. 9, it is possible that the mode for displaying the alert is changed according to a situation where the wireless connection request is made. Accordingly, it is possible that the alert is suitably displayed for the user and that the excessive display of the alert is suppressed.

At this point, the processing unit 210 performs processing that keeps the alert non-displayed, as the processing that sets the mode for displaying the alert to be the second display mode. That is, the processing that displays the alert in the second mode may be processing in which the alert is set to be kept non-displayed.

Figure 10:
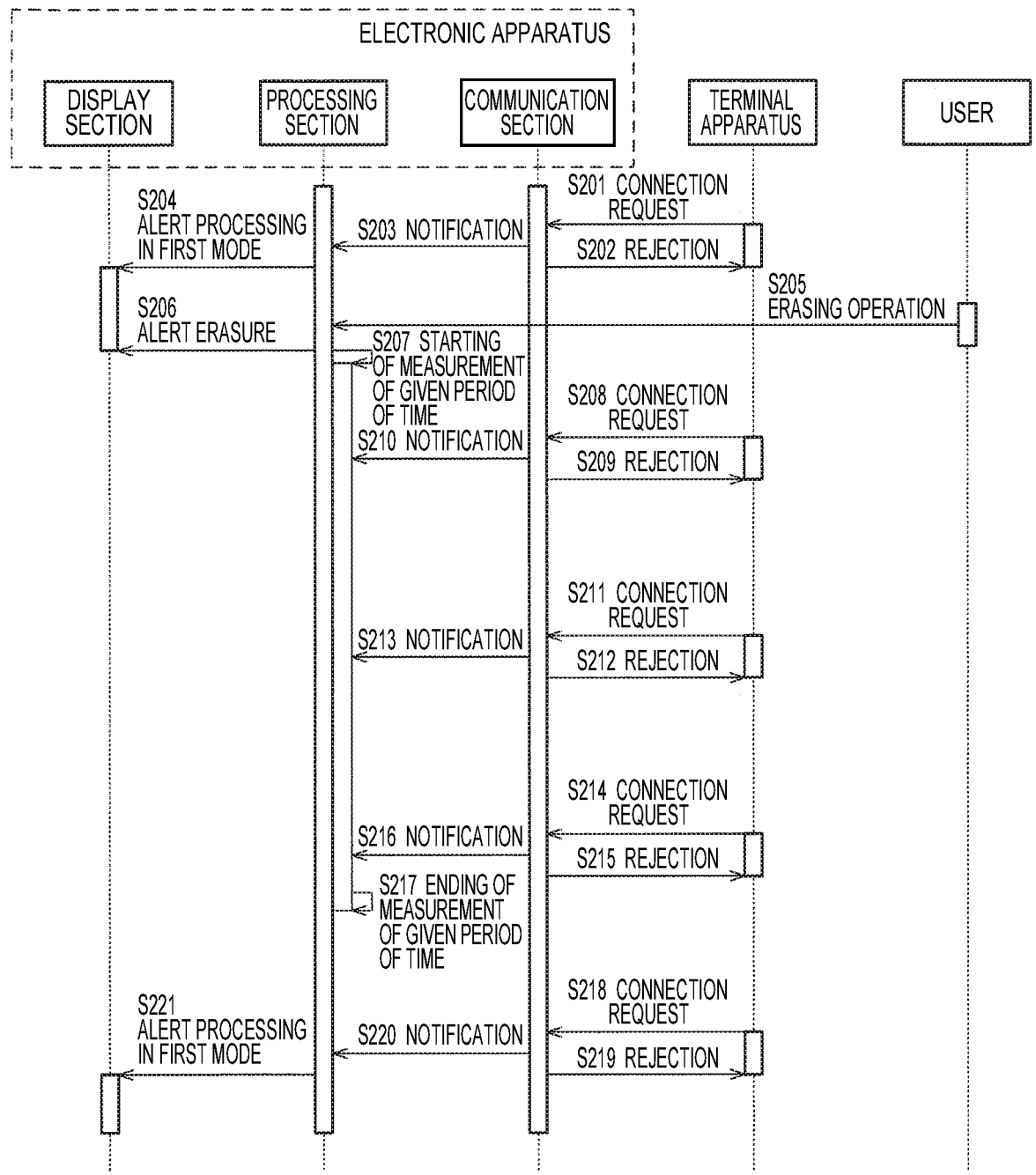
FIG. 10 is a sequence diagram in a case where a second mode is a mode in which the alert is set to be kept non-displayed.

FIG. 10 is a sequence diagram for describing processing in a case where the second mode is for alert non-display. Processing operations in S201 to S207 are the same as those in S101 to S107 in FIG. 9. That is, the wireless connection request from the new connection terminal 300 is rejected and the alert is displayed on the display unit 230. Then, the alert is kept non-displayed, and the processing unit 210 starts to measure the given period of time.

Although the wireless connection request is rejected in S202, the new connection terminal 300 again makes the wireless connection request (S208), and the wireless connection request is rejected (S209). The processing unit 210 receives the notification that the wireless connection request arrives from the new connection terminal 300 (S210), and determines that the wireless connection request is made before the given period of time. Consequently, the processing unit 210 rejects the wireless connection request, but the alert to that effect is kept non-displayed. At this point, the alert is kept non-displayed in S206. Because of this, the display unit 230 may maintain a state of being non-displayed, and it is possible that new display processing by the processing unit 210 on the display unit 230 is omitted.

In the same manner as in S211 to S216, the wireless connection request is periodically made from the new connection terminal 300 (S211 and S214), the wireless connection request is rejected (S212 and S215), and the notification to that effect is provided to the processing unit 210 (S213 and S216). The processing unit 210 determines that the given period of time did not elapse, and maintains an alert non-display state.

After the processing unit 210 ends the measuring of the given period of time (S217), and the wireless connection request is made from the new connection terminal 300 (S218). At this state, N terminal apparatuses 100 also have made connections to the internal access point. Because of this, the wireless connection request is rejected (S219), and the notification to that effect is provided to the processing unit 210 (S220). Because the given period of time elapsed, the processing unit 210 performs the processing that displays the alert in the normal mode (the first mode) (S221), and the screen in FIG. 5 is displayed on the display unit 230.

In an example in FIG. 10, in a case where the wireless connection request is rejected during a period of time other than the given period of time, the alert is displayed, and in a case where the wireless connection request is rejected during the given period of time, the alert is kept non-displayed. The alert display corresponds to the display in FIG. 5, and the alert non-display corresponds to any one of the displays in FIGS. 6 to 8. If this is done, the frequency with which the alert is displayed can be reduced. In an example in FIG. 10, the wireless connection request is five times rejected in a range that is illustrated (S202, S209, S212, S215, and S219), but the alert display can be limited to two times (S204, and S221). Because excessive alerts are suppressed, although the erasing operation is not performed, the user can perform viewing of information other than the alert or operating of the electronic apparatus 200, and thus it is possible that the convenience is improved.

However, in a case where the user convenience is considered, the alert display may be performed in a mode in which the alert display does not impose a constraint on the viewing of any other information or the user operation, and the processing that displays the alert in the second mode is not limited to the processing that keeps the alert non-displayed. For example, the processing unit 210 performs processing that narrows down an area for displaying the alert, compared with the first display mode, as the processing that sets the mode for displaying the alert to be the second display mode. The narrowing-down of the display area here means that the display area of the alert in the second mode decreases with respect to the display area of the alert in the first mode. In the example in FIG. 5, the alert is displayed on the entire display unit 230. Because of this, the alert is displayed on one area of the display unit 230, and thus it is possible that the display area is narrowed down.

Figure 11:
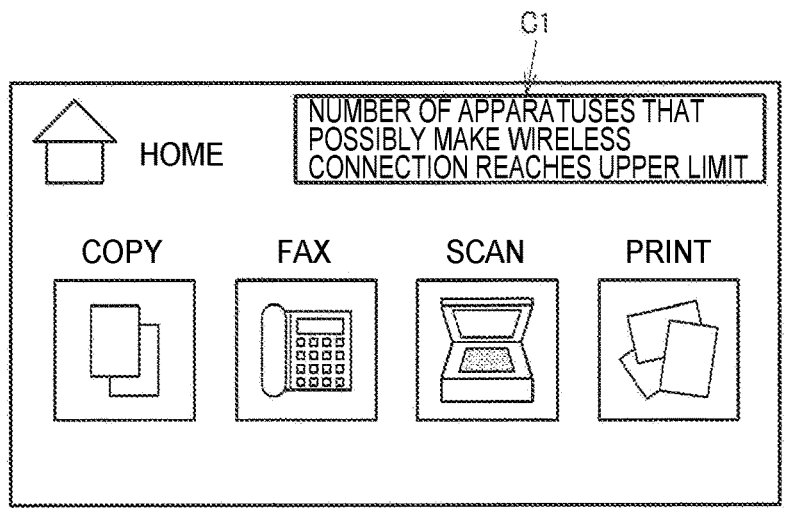
FIG. 11 is a diagram illustrating an example of a screen on which the alert is displayed in the second mode.
Figure 12:
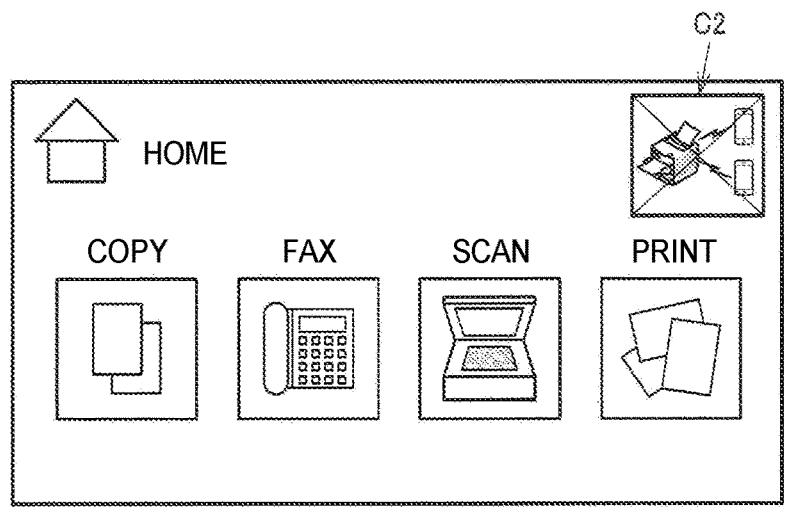
FIG. 12 is a diagram illustrating an example of the screen on which the alert is displayed in the second mode.

Each of FIGS. 11 and 12 illustrates an example of a display screen that appears when the alert is displayed in the second mode. In FIG. 11, text information C1 indicating that the number of apparatuses that possibly make wireless connections reaches an upper limit is displayed on a belt-shaped area (a rectangular area that is long in the horizontal direction) in an upper portion of the home screen (FIG. 6). In FIG. 12, an icon (image information or an object) C2 indicating that a wireless connection is not established between the electronic apparatus 200 and the terminal apparatus 100 is displayed on the upper right portion of the home screen. Any one of the areas C1 and C2 is an area that is narrow compared with the area (the entire display unit 230) for displaying the alert, in FIG. 5. By relatively narrowing down the alert display area in this manner, any other information can be displayed along with the alert and it is possible that the user operation is performed during the alert display.

It is noted that the display screen, of which the area for displaying the alert is relatively narrow is not limited to that in FIG. 11 or 12. For example, an area, a shape, a display position, and the like of the area for displaying the alert are changeable. Furthermore, information that is displayed within the area for displaying the alert may be changed to any other text information or image information (an icon or an object). Furthermore, information that is displayed on other than the area for displaying the alert is also not limited to the home screen in FIG. 11 or 12. Information that is equivalent to that in FIG. 7 or 8 may be displayed and any other information may be displayed.

Processing in a case where the home screen in FIG. 11 or 12 is displayed in the second mode is as illustrated in FIG. 9. During periods of time that are indicated by B1 and B3, the alert is kept non-displayed, and because of this, screens in FIGS. 6 to 8 and other figures are displayed. During periods of time that are indicated by B2 and B5, the alert is displayed in the first mode, and because of this, the screen in FIG. 5 is displayed. During a period of time that is indicated by B4, the alert is displayed in the second mode, and because of this, screens in FIG. 11 or 12 is displayed. If this is done, even in a case where the alert is displayed (B2, B4, and B5), the display mode can be changed according to the situation. In that case, a mode (the first mode in FIG. 5) in which emphasis is put on the alert display and a mode (the second mode in FIGS. 11 and 12) in which emphasis is put on the display of any other information or the user operation are set to be selectable, and thus balanced display control, such as control of excessive alerts along with suitable presentation of the alert to the user, is possible.

3. Modification Examples

Several modification examples will be described below.

3.1 Case where the User Continues to Perform Operation Inputting after the Alert Non-Display In FIG. 9 or 10, during a given period of time after the alert is kept non-displayed, the alert display is controlled. However, the given period of time may be updated without being limited to a fixed value. Specifically, in a case where the user performs the operation inputting on the electronic apparatus 200 before a given period of time has elapsed after the alert was kept non-displayed, the processing unit 210 performs processing that updates the given period of time. The operation here may be an operation that is performed on the operation unit 240 that is a physical button or a lever, and may be an operation that is performed on the operation unit 240 (a touch panel) that is integrally combined with the display unit 230.

In the operation of the electronic apparatus 200, in most cases, the operation is also performed referring to information that is displayed on the display unit 230. In an example in FIG. 7, regarding a layout or a size of an original document, in a case where a change is necessary, an operation of selecting a desired setting value is performed referring to a current setting value. Furthermore, in the case of a configuration that uses a touch panel, if a selection button or the like is not displayed on the display unit 230, from the first, a necessary operation cannot be performed. In any case, the display of the alert in the normal mode imposes a constraint on the user operation.

More precisely, in a case where the user operation is performed, the need to suppress the alert display is high compared with a case where the user operation is not performed. Consequently, in the present modification example, in a case where the user performs the operation inputting during a given period of time, the given period of time is updated. In a narrow sense, the update here is to extend the given period of time. If this is done, in a case where the user operation is performed, the given period of time is long compared with the case where the user operation is not performed. Because of this, the probability of displaying the alert in the second mode is high. Accordingly, the alert display is more suppressed, and the constraint on the user operation can be suppressed.

Figure 13:
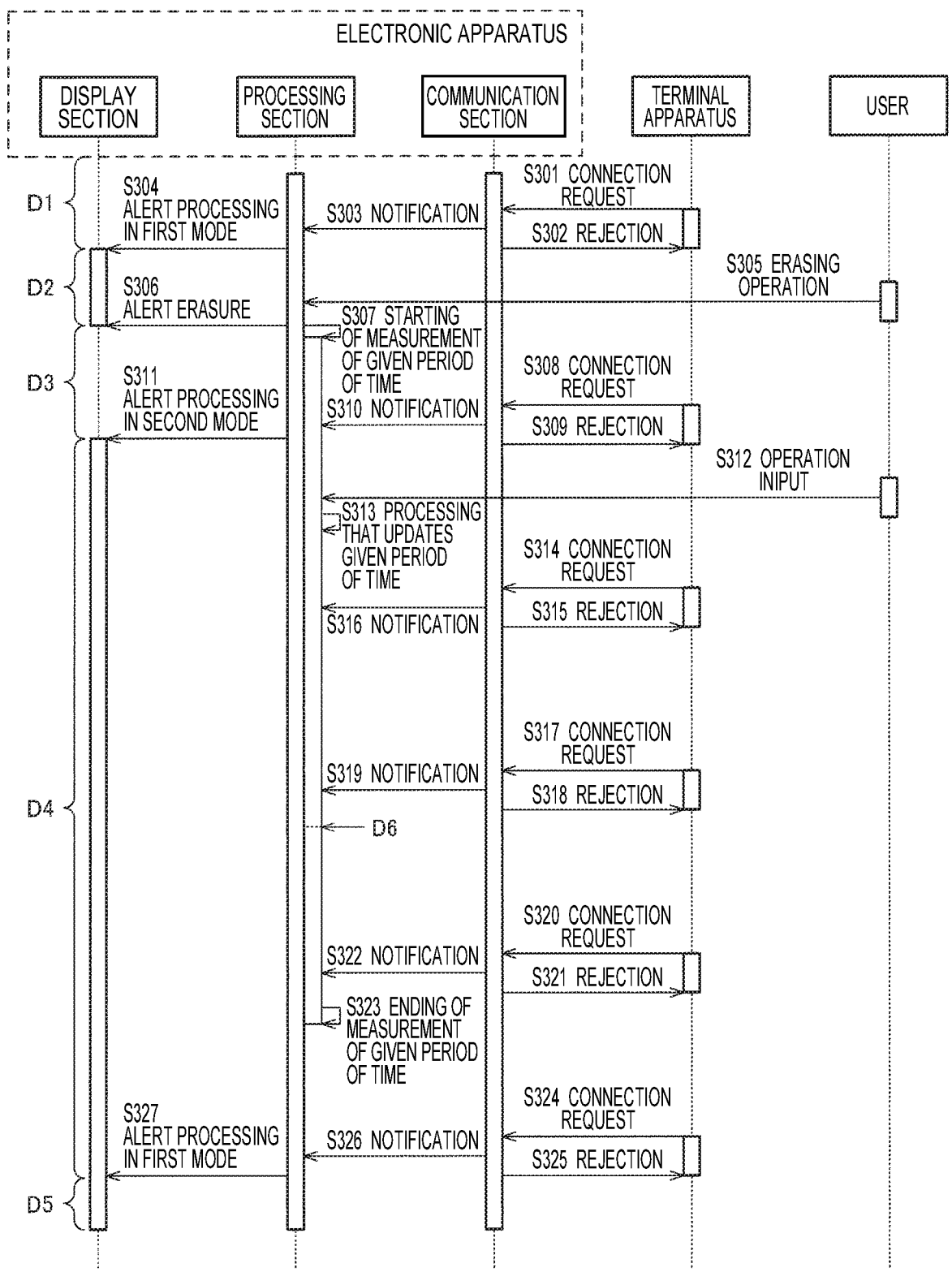
FIG. 13 is a sequence diagram in a case where a given period of time is updated based on operation inputting.

FIG. 13 is a sequence diagram for describing processing according to the present modification example. Processing operations in S301 to S311 are the same as those in S101 to S111 in FIG. 9. At this point, the user performs the operation inputting on the operation unit 240, and the processing unit 210 recognizes the operation inputting (S312). In this case, the processing unit 210 determines that the operation inputting is performed within a given period of time, and performs the processing that updates the given period of time (S313).

In a case where the measurement processing during the given period of time is the count-down processing or the count-up processing by the counter, processing in S313 can be realized by processing that resets the value of the counter to be an initial value. The initial value is a value that is equivalent to the given period of time, in the case of the count-down processing, and is 0 in the case of the count-up processing. Alternatively, instead of the value of the counter, the processing that updates a target value that is used when it is determined that the given period of time elapsed may be performed. Furthermore, in a case where the measurement processing during the given period of time is processing that determines whether or not an estimation point in time that corresponds to a time at which the given period of time will have elapsed arrives, the processing in S313 can be realized by processing that re-specifies the estimation point in time. Furthermore, the processing in S313 may be processing that extends the given period of time by any length.

Accordingly, the given period of time ends at a timing that is later than an end D6 of the given period of time at a point in time in S307. In an example in FIG. 13, at a timing that is illustrated in S323, the processing unit 210 determines that the given period of time elapsed, and ends the measurement processing.

For this reason, regarding to the wireless connection request that is illustrated in S320, as well as the wireless connection request from the terminal apparatus 100, which is illustrated in S314 and S317, when the wireless connection request is rejected (S315, S318, and S321), the processing unit 210 continues performing the processing that displays the alert in the second mode (S316, S319, and S322). The same is true for the wireless connection request that arrives after the given period of time elapsed, as those in FIG. 9 and other figures (S324 to S327).

In FIG. 13, the alert is kept non-displayed during periods of time that are indicated by D1 and D3, respectively (FIGS. 6 to 8 and other figures), and during periods of time that are indicated by D2 and D5, respectively, the mode for displaying the alert is the first mode (FIG. 5). Because, during a period of time that is indicated by D4, the mode for displaying the alert is the second mode, a screen in FIG. 11 or 12 is displayed, or screens in FIGS. 6 to 8 on which the alert is kept non-displayed are displayed. As understood from a comparison between FIGS. 9 and 13, particularly, a comparison in length between B2 and D4, in a case where it is detected that the user performs the operation inputting, the probability of suppressing the alert display is high compared with a case where the operation inputting is not detected. Accordingly, the imposing of constraint on the user operation is suppressed.

It is noted that in FIG. 13, the example is illustrated in which the user performs the operation inputting one time within the given period of time, but that no limitation to this is imposed. For example, the operation inputting may be performed multiple times. In this case, the processing unit 210 detects the operation inputting, and thus performs the processing that updates the given period of time.

Furthermore, in the processing unit 210, the processing that updates the given period of time may be performed based on any operation on the operation unit 240, but, without being limited to this, a condition for performing the update processing may be that a given operation is performed. For example, in a case where the operation inputting is performed that is determined as having a high probability of being continually performed by the user, the processing unit 210 updates the given period of time. More specifically, in a case where it is detected that a screen that is displayed on the display unit 230 transitions, the processing unit 210 updates the given period of time. The screen transitioning is transitioning from the screen in FIG. 6 to the screen in FIG. 7, transitioning from the screen in FIG. 6 to the screen in FIG. 8, or vice versa. In a case where a screen transitions, it can be determined that there is a high probability that the user will perform an operation on the electronic apparatus 200 for some purpose. Consequently, in a case where it is detected that the screen transitions, because the alert that is likely to impose a constraint on the user operation has to be suppressed, the given period of time is updated.

3.2 Multiple Terminal Apparatuses that Wait for Connections

The example is described above in which there is one new connection terminal 300 that makes a wireless connection. However, a case is also considered in which two or more new connection terminals 300 make wireless connection requests to the electronic apparatus 200. It is assumed that the wireless connection request by the first new connection terminal is rejected and that a given period of time starts after the alert display and non-display are accordingly performed. During the given period of time, there is a need to pay attention to how to deal with a case where the wireless connection request by the second new connection terminal is rejected.

Because the given period of time does not end, it is considered that the mode for displaying the alert may be the second mode, and implementation that corresponds to this is possible without any constraint. However, in a case where the wireless connection request by the second new connection terminal was not rejected previously, in some cases, a user (hereinafter referred to as a second user) of the second new connection terminal does not view the alert display. For this reason, in a case where the given period of time does not end and thus the alert display is controlled, there is a concern that the second user will not be suitably provided with the alert. Particularly, in the case of the second display mode in which the alert is kept non-displayed, in some cases, the second user cannot view all alerts until the given period of time ends.

Consequently, in the present modification example, the processing unit 210 performs the processing that displays the alert in the first display mode on the display unit 230, in a case where the communication unit 220 receives the wireless connection request from a second terminal apparatus (the terminal apparatus 100 or the second new connection terminal) that is different from any one of the terminal apparatus 100 (the existing connection terminal 400) that establishes a wireless connection to the internal access point and the terminal apparatus 100 (the first new connection terminal) that does not establish a wireless connection to the internal access point, until the given period of time elapsed.

In this manner, in a case where the wireless connection request from the terminal apparatus 100 that is different from the terminal apparatus 100 in which the alert display is already performed is rejected, although the given period of time does not end, the alert display in the first mode is performed and thus it is possible that the user is suitably notified of a cause of the rejection of the wireless connection.

It is noted that in order to perform this processing, there is a need to mutually identify the terminal apparatuses 100 that have made wireless connection requests. Consequently, the electronic apparatus 200 includes the storage unit 260 in which identification information on the terminal apparatus 100 that has made a wireless connection request to the communication unit 220 is stored, in a state where the number of terminal apparatuses 100 that establish wireless connections to the internal access point reaches the upper limit value N.

The wireless connection request from the terminal apparatus 100 is made to the electronic apparatus 200 by selecting a SSID of the internal access point of the electronic apparatus 200 and transmitting information including a management frame. Then, transmission source address information is included in the management frame, and as the transmission source address information, for example, a MAC address of the terminal apparatus 100 is used. That is, the electronic apparatus 200 receives the wireless connection request, and thus acquires the MAC address of the terminal apparatus 100 that is a transmission source of the request and it is possible that the acquired MAC address is stored in the storage unit 260. It is noted that the identification information on the terminal apparatus 100 is not limited to the MAC address and that examples of the identification information include any other information for possibly mutually identifying the terminal apparatuses 100.

In a state where the number of terminal apparatuses 100 that establish wireless connections to the internal access point reaches the upper limit value N, in a case where the communication unit 220 receives the wireless connection request from a given terminal apparatus 100, the processing unit 210 compares the identification information on the terminal apparatus 100 that make a wireless connection request, against identification information that is stored in the storage unit 260. Then, in a case where identification information that is the same as the identification information on the terminal apparatus 100 that makes a wireless connection request is not present in the storage unit 260, the processing unit 210 performs the processing that displays the alert in the first display mode on the display unit 230.

In this manner, in a case where a state where the number of terminal apparatuses 100 that make connections reaches the upper limit value N is set to be a condition for storing the identification information, when the number of terminal apparatuses 100 that make connections reaches the upper limit value N, the identification information on the terminal apparatus 100, of which the wireless connection request is rejected, can be a target for storage. That is, in a case where the identification information that is the same as the identification information on the terminal apparatus 100 that makes a wireless connection request is present in the storage unit 260, it can be determined that the alert, which is intended for the terminal apparatus 100, has been displayed. On the other hand, in the case where the identification information that is the same as the identification information on the terminal apparatus 100 that makes a wireless connection request is not present in the storage unit 260, it can be determined that the alert, which is intended for the terminal apparatus 100, is kept non-displayed.

Figure 14:
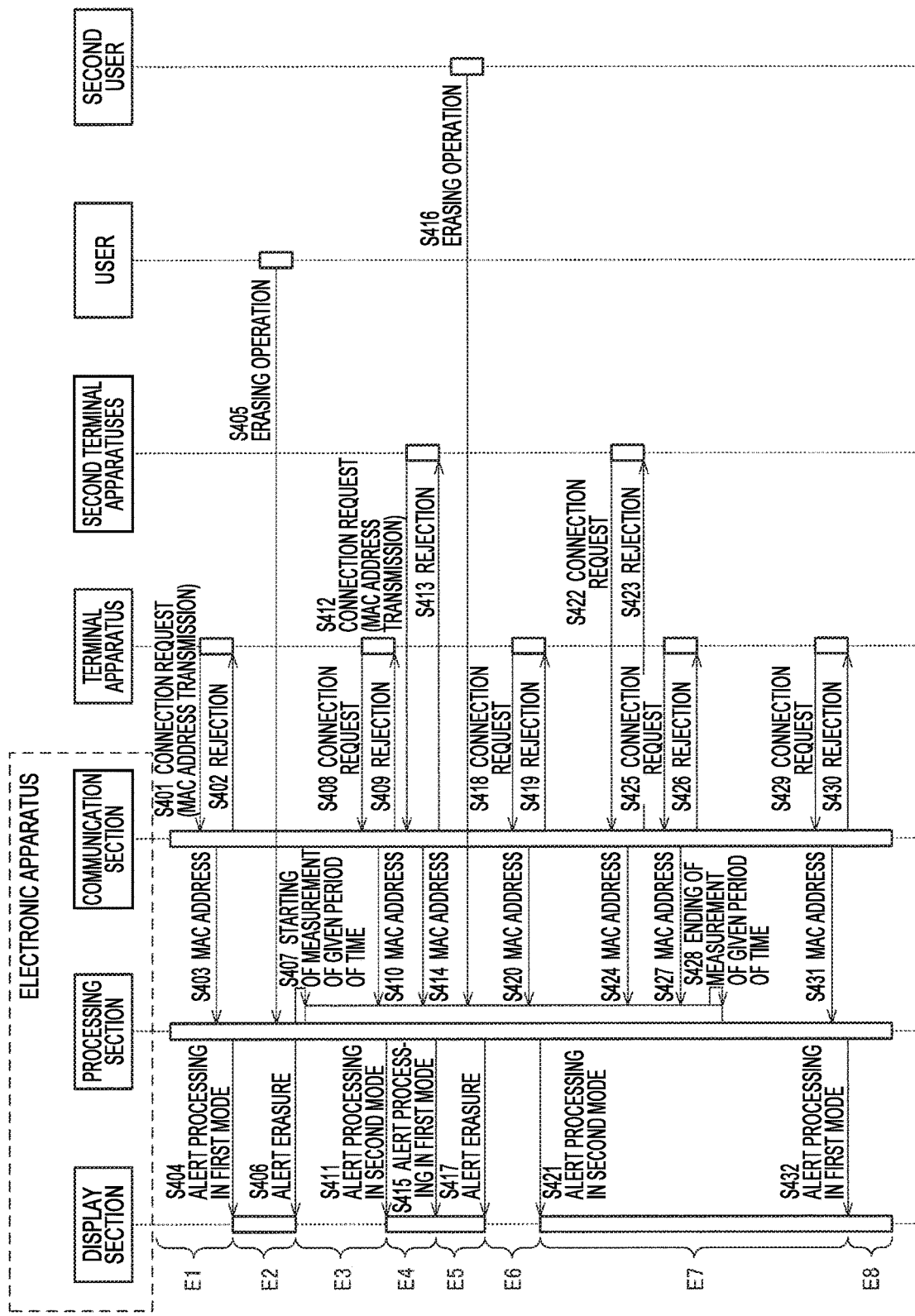
FIG. 14 is a sequence diagram in a case where multiple new connection terminals make wireless connection requests.

FIG. 14 is a sequence diagram for describing the processing according to the present modification example. The electronic apparatus 200 receives the wireless connection request from the terminal apparatus 100 (the first new connection terminal) and, in that case, acquires identification information on the first new connection terminal (S401). It is noted that, although not illustrated for simplification, the electronic apparatus 200 receives the wireless connection request from that point onward (S408, S418, S425, and S429) as well and receives the identification information on the first new connection terminal. The wireless connection request in S401 is rejected as in S102 and other steps in FIG. 9 (S402).

The processing unit 210 acquires the identification information on the first new connection terminal from the communication unit 220, along with the information that the wireless connection request is received (S403). Moreover, the processing unit 210 performs processing that displays the alert in the normal mode (the first mode) (S404). Furthermore, because the state where the number of terminal apparatuses 100 that make connections reaches the upper limit value N is entered, the processing unit 210 performs processing that stores the identification information on the first new connection terminal in the storage unit 260.

The alert is kept non-displayed based on the erasing operation by the user, and the measurement during a given period of time starts accordingly (S405 to S407) as in S105 to S107.

The first new connection terminal again performs the wireless connection request (S408), and the wireless connection request is rejected (S409). The processing unit 210 acquires the identification information on the first new connection terminal, along with the information that the wireless connection request from the new connection terminal 300 is present (S410). Because the given period of time does not end, the processing unit 210 performs procession that compares the identification information that is acquired in S410, against the identification information that is stored in the storage unit 260. Because the identification information on the first new connection terminal is acquired and stored in S403, it is determined that the identification information on the terminal apparatus 100 that has made a wireless connection request is present in the storage unit 260. Consequently, the processing unit 210 determines that the alert display in the normal mode is unnecessary, and performs the processing that displays the alert in the second mode (S411).

In a case where the second new connection terminal makes a wireless connection request (S412), the wireless connection request is rejected (S413). The processing unit 210 acquires the identification information on the second new connection terminal, along with the information that the wireless connection request from the new connection terminal 300 is present (S414). It is noted that, although not illustrated for simplification, the electronic apparatus 200 receives the wireless connection request thereafter (S416) from that point onward as well and receives the identification information on the second new connection terminal. Because the given period of time does not end, the processing unit 210 performs procession that compares the identification information that is acquired in S414, against the identification information that is stored in the storage unit 260. The identification information on the second new connection terminal is acquired for the first time in S414, and is not stored in the storage unit 260. Because it is determined that the identification information on the terminal apparatus 100 that has made a wireless connection request is not present in the storage unit 260, the processing unit 210 performs processing that displays the alert on the display unit 230 (S415). It is noted that, as understood from a flow from S414 to S415, strictly speaking, the identification information is stored in the storage unit 260 after the wireless connection request is made and the processing that displays the alert (the processing that compares the acquired information against the stored information) is performed, in the state where the number of terminal apparatuses 100 that make connections reaches the upper limit value N.

The user performs the operation of erasing the alert screen on the alert display in S415, and the processing unit 210 detects the erasing-operation inputting (S416). When the erasing operation is detected, the processing unit 210 performs the operation of erasing the alert (S417), and the display unit 230 erases the alert. There is a high probability that the second user who performs the erasing operation will be the user of the second new connection terminal, and it is possible that the alert is presented to a suitable user. However, the erasing operation is performed by a user who is different from the user of the second new connection terminal, without any constraint.

From that point onward, the first new connection terminal and the second new connection terminal intermittently repeat wireless connection requests at intervals in accordance with their respective setting. For example, after the processing in S417, the first new connection terminal makes a wireless connection request, and the wireless connection request is rejected (S418 and S419). The processing unit 210 acquires the identification information on the first new connection terminal (S420), and performs the processing that compares the acquired identification information against the identification information that is stored in the storage unit 260. Because the identification information on the first new connection terminal is present in the storage unit 260, the processing unit 210 determines that the alert display in the normal mode is unnecessary. At this point, the alert is in the non-display state, and because of this, the processing unit 210 performs the processing that displays the alert in the second mode (S421).

Thereafter, the second new connection terminal makes a wireless connection request, and the wireless connection request is rejected (S422 and S423). The processing unit 210 acquires the identification information on the second new connection terminal (S424), and performs the processing that compares the acquired identification information, against the identification information that is stored in the storage unit 260. With the previous wireless connection request (S414), the identification information on the second new connection terminal is stored in the storage unit 260. Consequently, the processing unit 210 continues to perform the processing that displays the alert in the second mode.

In an example in FIG. 14, the first new connection terminal again makes a wireless connection request within the given period of time, but in this case, because the identification information is stored in the storage unit 260, the processing that displays the alert in the second mode is continued as well (S425 to S427).

In a case where the measurement of the given period of time is completed (S428), and thereafter, the alert is displayed for the wireless connection request that is initially made. In an example in FIG. 14, the first new connection terminal makes a wireless connection request, the wireless connection request is rejected, and the alert is displayed (S429 to S432).

In FIG. 14, the alert is kept non-displayed during periods of time that are indicated by E1, E3, and E6, respectively (FIGS. 6 to 8 and other figures), and during periods of time that are indicated by E2, E5 and E8, respectively, the mode for displaying the alert is the first mode (FIG. 5). Because, during periods of time that are indicated by E4 and E7, respectively, the mode for displaying the alert is the second mode, the screen in FIG. 11 or 12 is displayed, or the screens in FIGS. 6 to 8 on which the alert is kept non-displayed are displayed.

It is noted that the present modification example and the modification example in which the given period of time described above is updated may be combined. For example, the processing that updates the given period of time is performed, which is triggered by displaying the alert within the given period of time (S415), performing an operation of keeping the alert non-displayed (S416), or the like.

Furthermore, various conditions for erasing the identification information that is stored in the storage unit 260 are considered. For example, in a case where the wireless connection to any of the existing connection terminals 400 is released, all pieces of identification information that are stored in the storage unit 260 are deleted. That is, at a stage where the number of terminal apparatuses 100 that establish wireless connections reaches the upper limit value N and then falls below the upper limit value N, the identification information is deleted, and thus a condition relating to the alert display within the given period of time is reset.

However, in a state where multiple new connection terminals 300 wait for connections, in some cases, wireless connections by the existing connection terminal 400 of which the number is smaller than the number of new connection terminals 300 waiting for connections are also released. For example, in a state where two new connection terminals, the first new connection terminal and the second new connection terminal wait for connections, in a case where a wireless connection by one existing connection terminal 400 is released, any one of the first new connection terminal and the second new connection terminal can establish a wireless connection. The other new connection terminal 300 continues to be in a state where the wireless connection cannot be established. That is, for the new connection terminal 300 that cannot establish a wireless connection, the alert has been displayed and the reason that the wireless connection cannot be established remains the same. Because of this, there is a low need to display the alert actively. Consequently, in a case where the wireless connection with any of the existing connection terminals 400 is released and where a wireless connection between a given new connection terminal 300 and the internal access point is established, identification information on the given new connection terminal 300 may be deleted from the storage unit 260.

Alternatively, each time a given period of time elapsed, the identification information on the storage unit 260 is erased without any constraint. In this case, during the given period of time, processing operations that are the same as those in a flow from S408 to S427 are performed.

3.3 Change of a Report Mode within a Given Period of Time

Furthermore, in FIG. 9, an example in which the mode for displaying the alert during a given period of time is fixed as the second mode is illustrated. For this reason, the second mode is continued during a period B4 of time in FIG. 9 and, if the second mode is a mode in which the alert is set to be kept non-displayed, as illustrated in FIG. 10, the alert non-display is continued during the given period of time. However, the display mode during the given period of time is not limited to this.

The processing unit 210 according to the present modification example performs processing that changes the mode for displaying the alert, according to the number of times that the wireless connection request is received from the terminal apparatus 100 to which the communication unit 220 does not establish a wireless connection, until a given period of time has elapsed after the alert was kept non-displayed.

Figure 15:
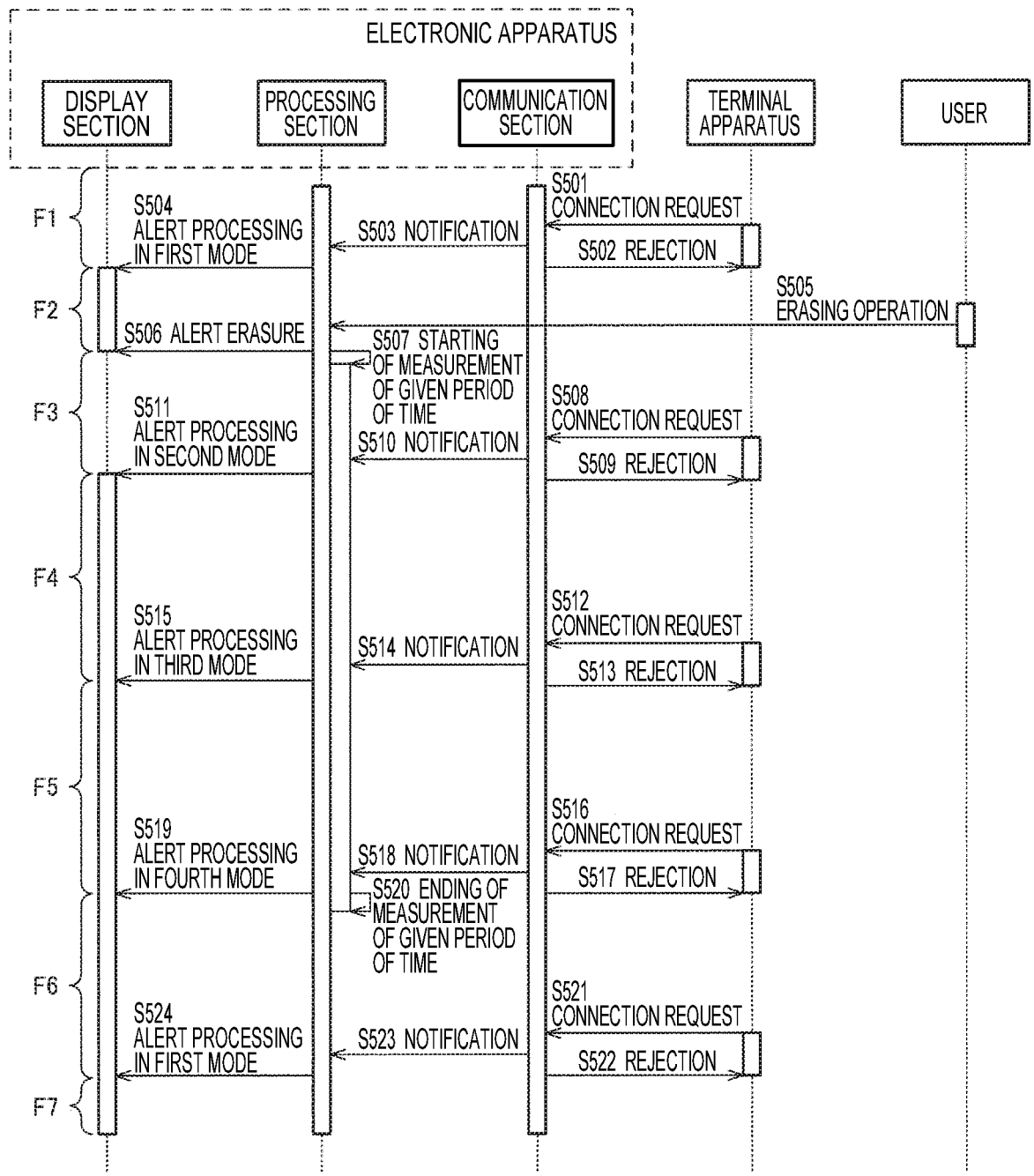
FIG. 15 is a sequence diagram in a case where a display mode is changed according to the number of times that the wireless connection request is acquired.

FIG. 15 is a sequence diagram for describing processing according to the present modification example. Processing operations in S501 to S511 are the same as those in S101 to S111 in FIG. 9, and, for the first wireless connection request within a given period of time, the mode for displaying the alert is the second mode.

Moreover, within the given period of time, the new connection terminal 300 makes a wireless connection request (S512), and the wireless connection request is rejected (S513). If a notification that the wireless connection request arrives from the new connection terminal 300 is acquired (S514), the processing unit 210 counts the number of times that the wireless connection request is made. Because the number of times that the wireless connection request is required is 2 within a given period of time, the processing unit 210 performs processing that changes the mode for displaying the alert to a third mode (S515).

Moreover, within the same given period of time, the new connection terminal 300 makes a wireless connection request (S516), and the wireless connection request is rejected (S517). If the notification that the wireless connection request arrives from the new connection terminal 300 is acquired (S518), the processing unit 210 counts the number of times that the wireless connection request is made. Because the number of times that the wireless connection request is required is 3, the processing unit 210 performs processing that changes the mode for displaying the alert to a fourth mode (S519). According to the number of times that the wireless connection request is made within the given period of time, the fourth mode may be omitted and any other mode, such as a fifth mode, may be added.

As in S118 to S122, the processing that displays the alert in the normal mode (the first mode) is performed for the wireless connection request that is performed after the given period of time elapsed (S520 to S524).

In FIG. 15, the alert is kept non-displayed during periods of time that are indicated by F1 and F3, respectively (FIGS. 6 to 8 and other figures), and during periods of time that are indicated by F2 and F7, respectively, the mode for displaying the alert is the first mode (FIG. 5). The mode for displaying the alert is the second mode during a period of time that is indicated by F4, the mode for displaying the alert is the third mode during a period of time that is indicated by F5, and the mode for displaying the alert is the fourth mode during a period of time that is indicated by F6. The second to fourth modes in FIG. 15 are set to be modes that different from each other, without any constraint. For example, an embodiment is considered in which the second mode is a mode in which a screen in FIG. 11 is displayed, the third mode is a mode in which a screen in FIG. 12 is displayed, and the fourth mode is a mode in which the alert is kept non-displayed. However, the display mode within the given period of time in the present modification example may include at least two different display modes, and all display modes do not need to be different from each other. For example, with the first wireless connection request and the second or later wireless connection request within a given period of time, the display mode may be changed. In other words, the second mode and the third mode may be set to be different modes, and the third mode and the fourth mode may be set to be a common mode.

For example, in a case where the communication unit 220 receives the first wireless connection request from the terminal apparatus 100 to which the processing unit 210 does not establish a wireless connection, within a given period of time after the alert is kept non-displayed, the processing unit 210 performs processing that displays the alert on the display unit 230 and that automatically sets the displayed alert to be kept non-displayed. Moreover, in a case where the second or later wireless connection request is received from the terminal apparatus 100 to which the communication unit 220 does not establish a wireless connection, the processing unit 210 does not display the alert.

Figure 16:
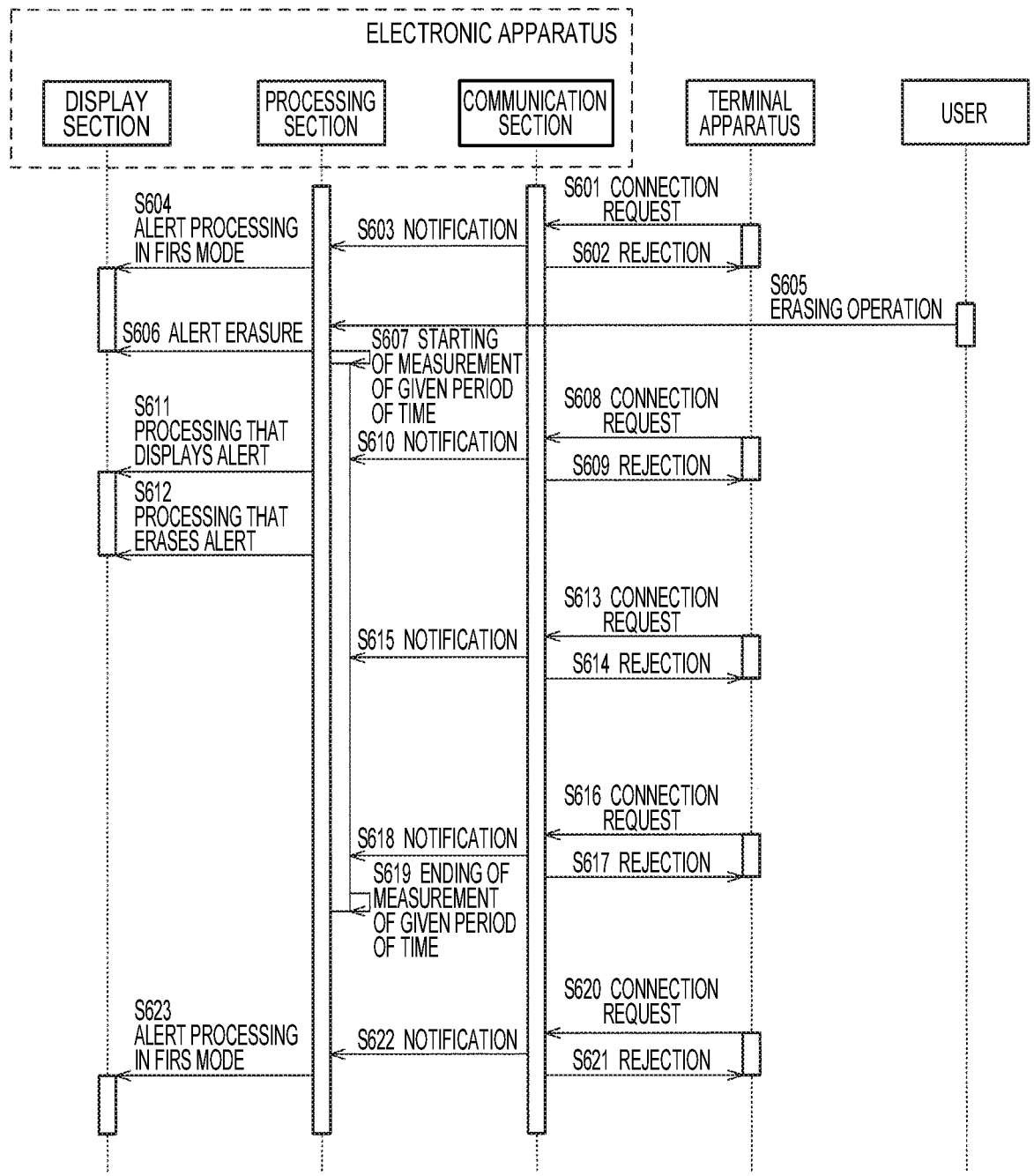
FIG. 16 is a specific sequence diagram in the case where the display mode is changed according to the number of times that the wireless connection request is acquired.

FIG. 16 is a sequence diagram for describing processing in this case. Processing operations in S601 to S610 are the same as those in S501 to S510 in FIG. 15, and the processing unit 210 performs the processing that displays the alert, on the first wireless connection request within a given period of time (S611). For example, a screen that is displayed at this point is the same screen in FIG. 5 as for the first mode. However, while the first mode is a mode in which the displaying is continued until it is detected that the user performs the operation inputting, in the second mode, the processing that erases the alert is automatically performed without the need for a user operation (S612). For example, the processing unit 210 performs processing that keeps the alert non-displayed after a given time has elapsed since the alert was displayed. If this is done, different display modes can be realized in which an operation load on the user is reduced while using the same screen as for the first mode.

Furthermore, in an example in FIG. 16, within the same given period of time, the new connection terminal 300 makes the second and third wireless connection requests (S613 and S617), and the wireless connection requests are rejected (S614 and S617). In a case where the second and third wireless connection requests are notified (S615 and S618), the processing unit 210 does not display the alert. At this point, because the alert is kept non-displayed in S612, the processing unit 210 maintains the alert non-display state. That is, the third mode (or the fourth mode) is a mode in which the alert is kept non-displayed. Processing that is performed after a given period of time elapsed is the same as in FIG. 15 and other figures (S619 to S623).

As described with reference to FIGS. 15 and 16, the display mode is changed according to the number of times that "the wireless connection request is acquired within the given period of time, and thus flexible display control is possible.

It is noted that the example is described above in which the processing unit 210 displays the alert on the display unit 230, but that no limitation on this is imposed. For example, the processing unit 210 may present the alert to the user by causing the reporting unit 270 to perform reporting. Specifically, with light emitting by a light emitting unit (LED), such as a light emitting diode, outputting of sound or voice through a speaker, vibration produced by a vibration motor, or the like the alert is reported to the user.

Furthermore, in a case where the electronic apparatus 200 has a printing function, an embodiment as described below is also possible. In a case where the first wireless connection request is received from the terminal apparatus 100 to which the communication unit 220 does not establish a wireless connection, within a given period of time after the alert is kept non-displayed, the processing unit 210 performs processing that prints the alert. Furthermore, in a case where the second or later wireless connection request is received from the terminal apparatus 100 to which the communication unit 220 does not establish a wireless connection, the processing unit 210 does not perform printing and displaying of the alert.

If this is done, it is possible that the alert within the given period of time is transferred to the user by performing the printing. If the printing is performed, because there is no need to display the alert on the display unit 230, the user views information or performs an operation without any constraint. Furthermore, in a case where the printing is performed for each wireless connection request within the given period of time, it is not preferable that a printing medium, or in a narrow sense, a printing sheet of paper, which is a user's resource, is consumed. In this respect, the printing process is performed in a manner that is limited to a small number of times, or in a narrow sense, the first wireless connection request within the given period of time and thus consumption of the printing medium can be suppressed.

The embodiments and the modification examples thereof in which the invention finds application are described above, but the invention is not limited to the embodiments and the modification examples thereof as are. At stages of implementation, a constituent element can be modified and thus a modification thereof can be realized within the scope that does not depart from the gist of the invention. Furthermore, various inventions can be conceived and be reduced to practice by suitably combining the multiple constituent elements that are disclosed in each of the embodiments or each of the modification examples thereof, which are described above. For example, of all constituent elements that are described in each of the embodiments or each of the modification examples thereof, several constituent elements may be deleted. Moreover, the constituent elements that are described in the different embodiments or the different modification examples thereof may be suitably combined. Furthermore, in the specification or the drawings, a term that is described at least once together with a different term that has a broader meaning or the same meaning can be replaced with the different term, throughout the specification or the drawings. In this manner, various modifications or applications are possible within the scope that does not depart from the gist of the invention.

The entire disclosure of Japanese Patent Application No. 2018-011420, filed Jan. 26, 2018 is expressly incorporated by reference herein.

What is claimed is:

1. An electronic apparatus comprising:
a communicator that performs wireless communication which uses an internal access point of the electronic apparatus;
a processor that performs communication control of the communicator; and
a display,
wherein, in a state where the number of terminal apparatuses that establish wireless connections to the internal access point reaches an upper limit value of the number of the terminal apparatuses that possibly make connections to the internal access point,
in a case where the communicator receives a wireless connection request from a terminal apparatus that does not establish a wireless connection to the internal access point,
the processor
rejects the wireless connection request from the terminal apparatus that does not establish the wireless connection, and
performs processing that displays an alert, which indicates that a cause of the rejection of the wireless connection request is that the number of the terminal apparatuses that establish the wireless connections to the internal access point reaches the upper limit value, in a first display mode on the display,
in a case where, after the alert was erased via a user indication, the wireless connection request is again received from the terminal apparatus, to which the communicator does not establish the wireless connection, the processor performs processing that sets a mode for displaying the alert to be a second display mode that is different from the first display mode for a predetermined period of time, and
after the predetermined period of time, the wireless connection request is again received from the terminal apparatus, to which the communicator does not establish the wireless connection, the processor performs processing that sets a mode for displaying the alert to be the first display mode again.

2. The electronic apparatus according to claim 1,
wherein, in a case where a user performs operation inputting on the electronic apparatus before the given period of time has elapsed after the alert was kept non-displayed, the processor performs processing that updates the given period of time.

3. The electronic apparatus according to claim 1,
wherein the processor performs processing that keeps the alert non-displayed, as processing that sets the mode for displaying the alert to be second display mode.

4. The electronic apparatus according to claim 1,
wherein the processor performs processing that narrows down an area for displaying the alert, compared with the first display mode, as processing that sets the mode for displaying the alert to be the second display mode.

5. The electronic apparatus according to claim 1,
wherein the processor performs the processing that displays the alert in the first display mode on the display unit, in a case where the communicator receives a wireless connection request from a second terminal apparatus that is different from any one of the terminal apparatuses that establishes the wireless connection to the internal access point and the terminal apparatus that does not establish the wireless connection to the internal access point, until the given period of time elapsed.

6. The electronic apparatus according to claim 1, further comprising:
a storage in which identification information on the terminal apparatus that has made a wireless connection request to the communicator is stored, in the state where the number of the terminal apparatuses that establish the wireless connections to the internal access point reaches the upper limit value,
wherein, in the state where the number of the terminal apparatuses that establish the wireless connections to the internal access point reaches the upper limit value,
in a case where the communicator receives a wireless connection request from a given terminal apparatus, the processor compares identification information on the terminal apparatus that makes the wireless connection request against the identification information that is stored in the storage, and, in a case where identification information that is the same as the identification information on the terminal apparatus that makes the wireless connection request is not present in the storage, the processor performs the processing that displays the alert in the first display mode on the display.

7. The electronic apparatus according to claim 1,
wherein the processor performs processing that changes the mode for displaying the alert, according to the number of times that the wireless connection request is received from the terminal apparatus to which the processor does not establish the wireless connection, until the given period of time has elapsed after the alert was kept non-displayed.

8. The Electronic apparatus according to claim 7,
wherein, in a case where the first wireless connection request is received from the terminal apparatus to which the communicator does not establish the wireless connection, within the given period of time after the alert was kept non-displayed, the processor displays the alert on the display and performs processing that automatically sets the displayed alert to be kept non-displayed, and
wherein, in a case where the second or later wireless connection request is received from the terminal apparatus to which the communicator does not establish the wireless connection, the processor does not display the alert.

9. The electronic apparatus according to claim 1,
wherein, in a case where the first wireless connection request is received from the terminal apparatus to which the communicator does not establish the wireless connection, within the given period of time after the alert was kept non-displayed, the processor performs processing that prints the alert, and
wherein, in a case where the second or later wireless connection request is received from the terminal apparatus to which the communicator does not establish the wireless connection, the processor does not perform printing and displaying of the alert.

* * * * *